United States Patent
Hartmann et al.

(10) Patent No.: US 6,373,669 B1
(45) Date of Patent: Apr. 16, 2002

(54) PROCESS AND ARRANGEMENT FOR SELECTIVE NETWORK MONITORING FOR SWITCHGEAR

(75) Inventors: Werner Hartmann, Grossenseebach; Wilfried Haas, Erlangen; Jörg Kieser, Forchheim; Harald Kurzmann, Berlin, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/381,874

(22) PCT Filed: Mar. 26, 1997

(86) PCT No.: PCT/DE97/00621

§ 371 Date: Feb. 15, 2000

§ 102(e) Date: Feb. 15, 2000

(87) PCT Pub. No.: WO98/43333

PCT Pub. Date: Oct. 1, 1998

(51) Int. Cl.$^7$ .................................................. H02H 3/00
(52) U.S. Cl. .......................... 361/62; 361/42; 361/93.1; 361/67
(58) Field of Search ........................ 361/62–64, 67–68, 361/42, 93.1, 93.2, 102, 78, 87; 324/415, 423, 424; 340/638; 307/116, 125, 131

(56) References Cited

U.S. PATENT DOCUMENTS

| | | | | |
|---|---|---|---|---|
| 4,464,696 A | * | 8/1984 | Masui et al. ................... 361/42 |
| 4,670,812 A | * | 6/1987 | Doerfler et al. ................ 361/83 |
| 4,780,786 A | * | 10/1988 | Weynachter et al. .......... 361/87 |
| 4,811,154 A | | 3/1989 | Trenkler et al. |
| 5,604,437 A | * | 2/1997 | Moncorge et al. .......... 324/424 |
| 5,629,869 A | * | 5/1997 | Johnson et al. ............... 702/34 |
| 5,747,984 A | * | 5/1998 | Amft et al. ................. 324/71.2 |
| 5,815,352 A | * | 9/1998 | Mackenzie .................... 361/42 |
| 5,828,540 A | * | 10/1998 | Marmonier et al. ......... 361/195 |
| 6,225,807 B1 | * | 5/2001 | Pohl ........................... 324/423 |

FOREIGN PATENT DOCUMENTS

| | | |
|---|---|---|
| DE | 38 37 605 | 5/1989 |
| DE | 40 28 721 | 3/1992 |
| EP | 0 096 601 | 12/1983 |
| EP | 0 116 509 | 8/1984 |

OTHER PUBLICATIONS

M. Lindmayer, et al. "Digitale Algorithmen zur frühzeitigen Kurzschlußerkennung", etz Bd. 112 (1991), pp. 718–722 *Described in the Specification.
Buchholz et al., "Neue sekundärtechnische Lösungen fur Mittelspannungsschaltanlagen", Elektrizitätswirtschaft, Jg. 94 (1995), pp. 834–838** English translation provided.

* cited by examiner

Primary Examiner—Michael J. Sherry

(57) ABSTRACT

In switchgear with superordinate power circuit-breakers and a plurality of subordinate power circuit-breakers, the superordinate power circuit-breaker must be triggered in the event of failure of the subordinate power circuit-breakers. This is accomplished as follows: electrical post-arc currents are detected after current zero, the electrical post-arc currents are compared with a predetermined limit value, and if the limit value is exceeded, a signal is effected for triggering the superordinate power circuit-breaker in the switchgear. This method can advantageously be implemented in particular in the case of vacuum circuit-breakers with at least one vacuum interrupter. The associated arrangement has a device which monitors the subordinate power circuit-breakers and, if appropriate, triggers the superordinate power circuit-breaker.

11 Claims, 4 Drawing Sheets

PROCESS AND ARRANGEMENT FOR SELECTIVE NETWORK MONITORING FOR SWITCHGEAR

FIELD OF THE INVENTION

The present invention relates to a method for selective network monitoring for switchgear. In addition, the present invention also relates to the associated arrangement for implementing the method.

BACKGROUND INFORMATION

In power distribution installations, one of the most important disruptions occurring in practice is a short circuit in subdistribution networks which leads to short-circuit currents which are generally more than one order of magnitude above the rated currents in the network. Not only can such short circuits lead to local damage due to the arc that is generally produced in the event of a short circuit, but also they impair the security and functioning of the superordinate network. For this reason, power circuit-breakers are used in subdistribution networks, in order, in the event of disruptions in the network, to isolate the affected part of the network, i.e. the subdistribution board with loads in this respect, from the remaining region and, in this way, ensure unimpaired functioning of the overall system. These power circuit-breakers have the task of interrupting the short-circuit current after only a few current half-cycles, in order to minimize any damage and impairment of the network that occur. The power circuit-breakers generally comprise a stationary contact and a contact that can be moved relative thereto, which open a previously closed electric circuit by mechanically separating the contact elements.

In exceptional cases, failure of the power circuit-breaker may occur when, by way of example, the switching contacts have reached the end of their service life. In this case, a superordinate power circuit-breaker must isolate a correspondingly larger part of the subordinate network from the rest of the network. Problems that are posed here involve identifying the failure of the subordinate power circuit-breaker with a high degree of reliability and very early on, in order that the superordinate power circuit-breaker is triggered with a sufficiently short time delay. Especially in the case of vacuum circuit-breakers, when so-called late failures occur, i.e., events in which the power circuit-breaker initially separates successfully but then fails due to an arc restriking, diagnosis of the switching behavior is very important in order to lead with certainty to the triggering of the superordinate power circuit-breaker.

In practice, conventional methods which identify a short circuit on account of the current amplitude in the network and, if appropriate, generate a corresponding signal for triggering the superordinate power circuit-breaker. According to this method, it is generally necessary to effect measurement over a number of current half-cycle durations in order to obtain a sufficiently high signal-to-noise ratio in particular with respect to false triggering. This method has the disadvantage that— in particular in the event of failure of the subordinate circuit-breakers— the short-circuit current has to flow for a number of half-cycles in order to be able to be identified with certainty. This measure is necessary in order to reliably distinguish operational overcurrents from short circuits. This means, however, that damage may already be produced at the location of the short circuit and the disturbance may propagate widely through the power distribution network.

Furthermore, early identification of a short circuit by simultaneous analysis of the rate of current rise in addition to the current amplitude is described in U.S. Pat. No. 4,811,154. A method for early identification of a short circuit by means of digital algorithms is also described in etz, Vol. 112 (1991), pp. 718–722. Early identification of a short circuit is thus possible as early as in the rising part of a half-cycle with the instantaneous current still being comparatively small. However, in this case, too, the failure of a power circuit-breaker can be detected only in combination with the detection of an inadequately long arc duration in the relevant circuit-breaker. Especially in the case of multipole switching devices, it is therefore necessary to concomitantly measure the arc duration in all poles. Corresponding diagnosis as well as the early identification of a short circuit itself are therefore very complicated and cost-intensive. In particular, late failures cannot be identified until they occur and, for this reason, at the very least cannot be predicted.

SUMMARY

An object of the present invention, therefore, is to provide a method and an associated arrangement which enables improved selectivity in the network monitoring for switchgear.

This object is achieved by providing the following features:

electrical post-arc currents are detected after current zero,
the electrical post-arc currents are compared with a predetermined limit value, and
if the limit value is exceeded, a signal is generated for triggering a superordinate power circuit-breaker in the switchgear.

In the associated arrangement in which the network of a switchgear has at least one superordinate power circuit-breaker and a plurality of subordinate power circuit-breakers, a device is present which monitors the subordinate power circuit-breakers and, if appropriate, triggers the superordinate power circuit-breaker. For this purpose, the device comprises units for state identification and current measurement including the detection of the post-arc current of the power circuit-breakers, on the one hand, and a release for the superordinate power circuit-breaker.

The solution according to the present invention is based, therefore, on the measurement of the post-arc currents using structural elements of the power circuit-breakers. This is possible, in particularly, using the vapor shields in vacuum circuit-breakers. The level of the post-arc currents is a measure of the dielectric recovery of an interrupter following successful disconnection of a short-circuit current at the end of a current half-cycle. Using an extensive series of experiments, it has been possible to demonstrate that, above an experimentally confirmed, sharply defined limit of the post-arc current after the current zero crossing, even if disconnection is initially successful, failure of the relevant interrupter must be expected with a high probability. On the other hand, a reliable isolating behavior is ensured below this limit. The absolute position of this limit is dependent on the design but, specifically in the case of vacuum interrupters, lies in a range of from about 5 to 15 A which is readily accessible to measurements.

If the present invention is applied to vacuum interrupters, in particular, a prediction regarding the time response in the case of interrupters with a shield that is linked on one side, i.e., with an electrical connection between the vapor shield and one of the two electrodes, is also made possible, even if the interrupter does not fail until after a few 100 ms due to a late failure.

A method is provided in which, specifically in the case of vacuum circuit-breakers in detail, the current is measured and analyzed after the first current zero crossing of the opening switching pole, in order to generate a signal for triggering the superordinate power circuit-breaker in the event of a preset threshold value being exceeded. Consequently, the sub-region of the network with the failing power circuit-breaker can be isolated from the network very early on— as a matter of fact even before the actual failure under certain circumstances in the case of late failures. As a result, a degree of security in power distribution networks is achieved which was not possible using previous methods. In particular, instances of damage and hazards due to the arc occurring in the region of the short circuit are greatly reduced and consequential costs and emissions, such as sound and/or arc products, are minimized.

Figure 1:
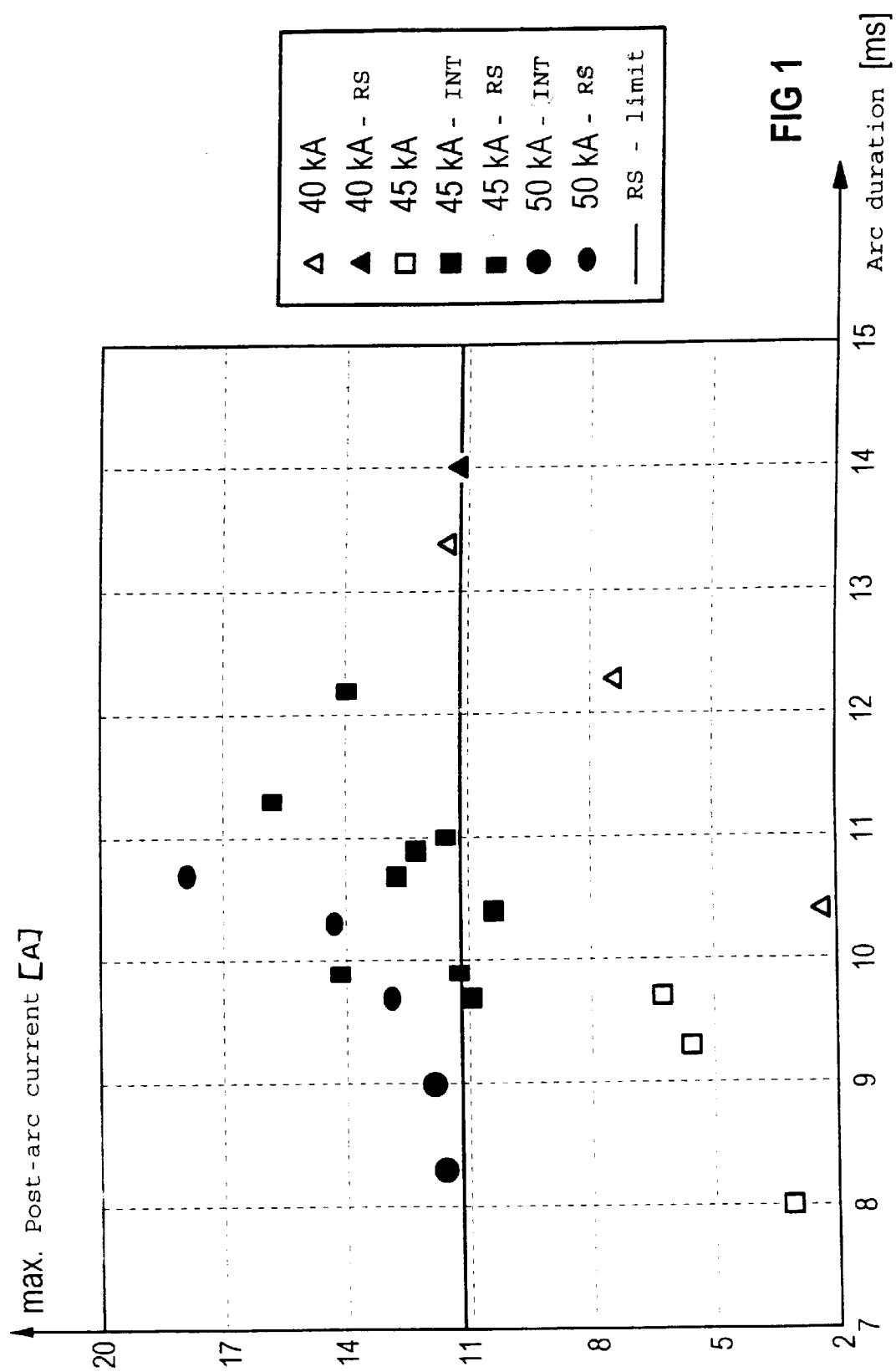
FIG. 1 shows a graphical plotting of the maximum post-arc current specifically during the opening of vacuum circuit-breakers, plotted against the arc duration.

FIG. 1 reproduces the results of extensive investigations. FIG. 1 shows a plot experimentally measured post-arc currents which relate to restriking or late failures as a function of the arc duration, this being identified by filled-in symbols, and the post-arc currents which were measured in the case of entirely satisfactory opening without restriking, this being identified by symbols that are not filled in. The order of magnitude of the post-arc currents lies in the range of from about 5 to 15 A, and the measurement times in the ms range. It is evident from the illustration according to FIG. 1 that there is a limit below which a reliable isolating behavior is ensured, whereas above the limit the failure of the relevant interrupter must be expected with high probability even if disconnection is initially successful.

Figure 2:
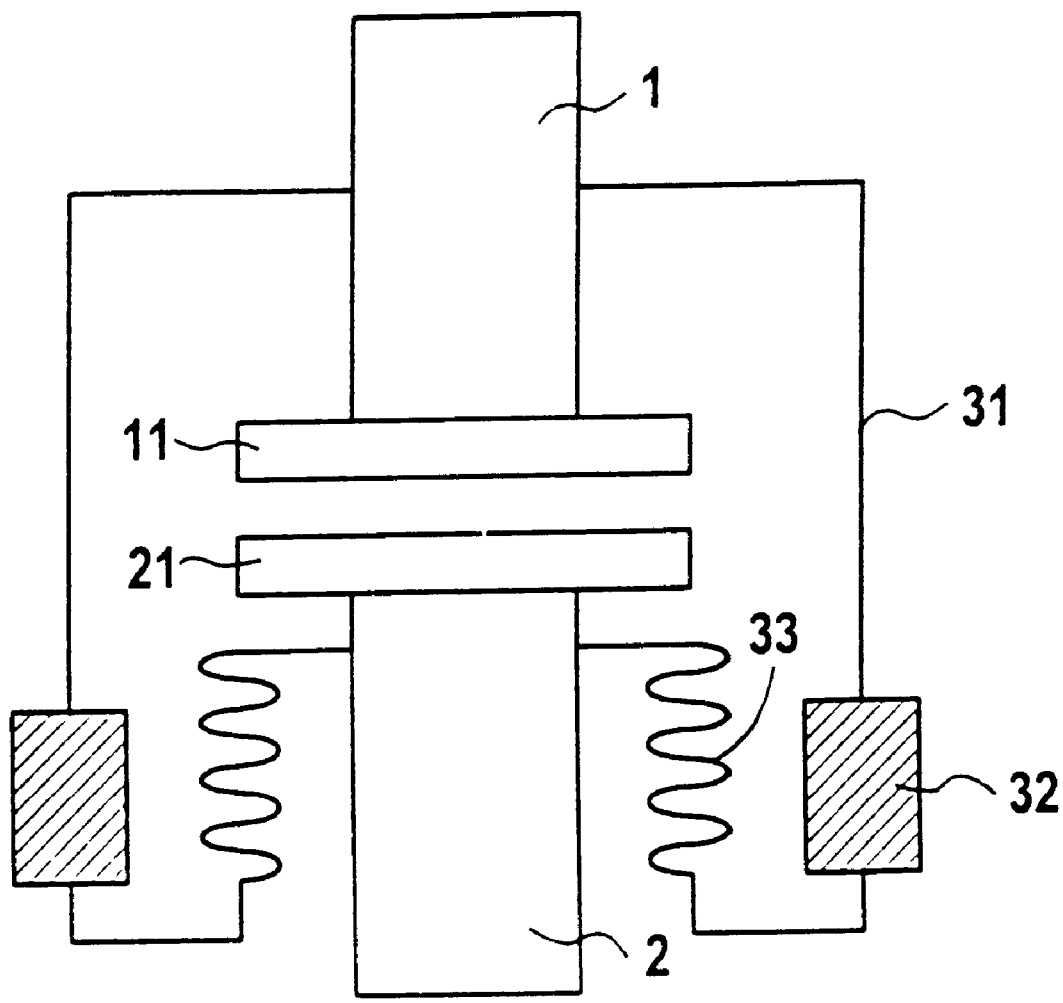
FIG. 2 shows a schematic illustration of a vacuum circuit-breaker in which the measurements according to FIG. 1 were carried out.

The measurements for the illustration according to FIG. 1 were performed specifically on a vacuum interrupter, reproduced schematically in FIG. 2. In this case, 1 denotes the stationary power supply bolt and 2 the movable power supply bolt, the bolts carrying at their ends a stationary contact 11, on the one hand, and a movable contact 21, on the other hand. The contacts are arranged inside the interrupter 30, which is hermetically closed off with respect to the outside and comprises a vapor shield 31, which forms the encapsulation as it were and is connected to the stationary power supply bolt 1, an insulator 32 and bellows 33. Such interrupters are known with all sorts of variations in practice.

Figure 3:
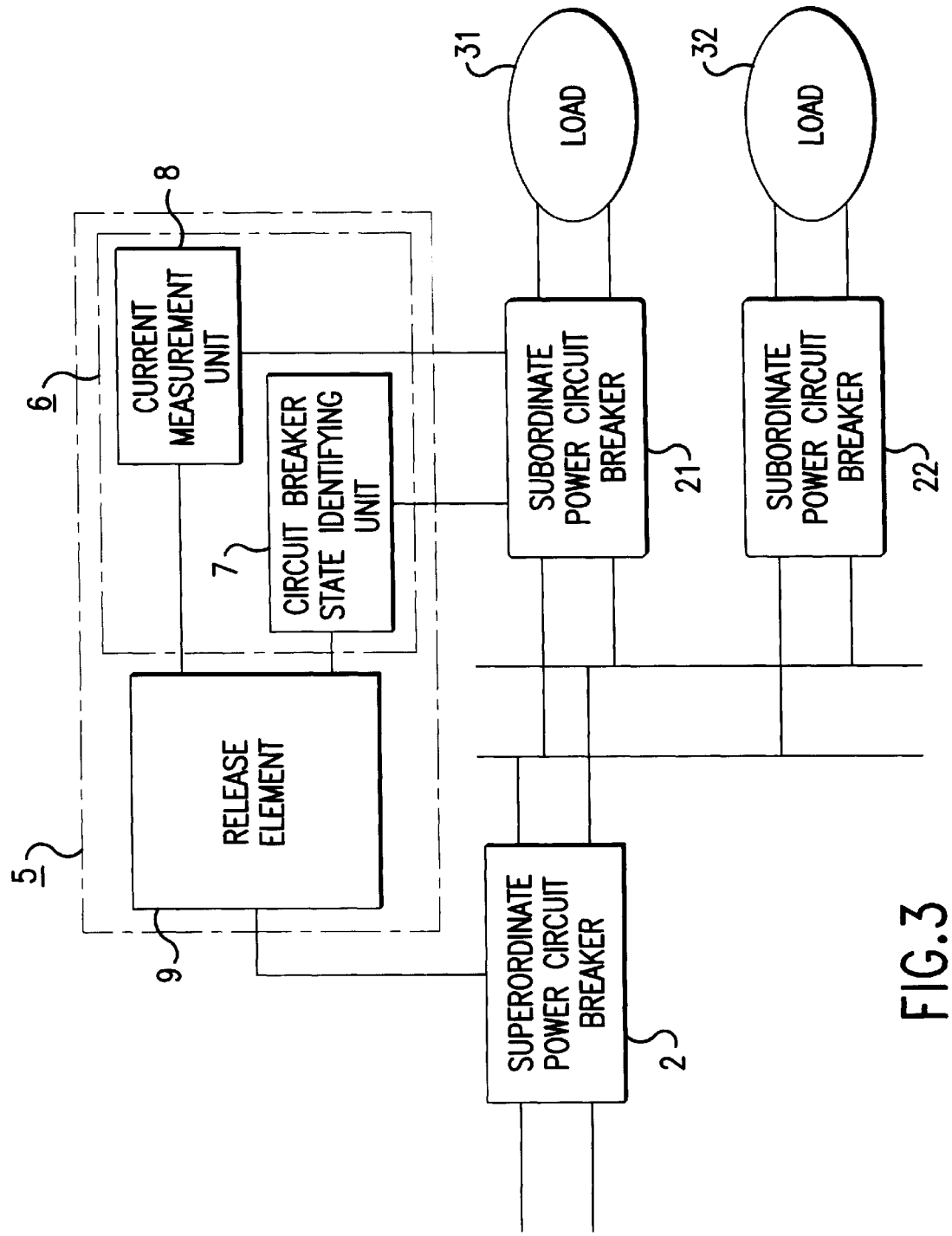
FIG. 3 shows an arrangement for selective network monitoring for a specifically single-pole power circuit-breaker.

FIG. 3 illustrates a line network in which a series of subdistribution boards or loads which can each be switched in or out by means of a dedicated, subordinate power circuit-breaker are protected by a superordinate power circuit-breaker. The superordinate power circuit-breaker is designated by 2, while the two subordinate power circuit-breakers illustrated in FIG. 3 have the reference symbols 21 and 22 and the loads connected downstream have the reference symbols 31 and 32.

In the event of a short circuit in one of the subdistribution boards, the associated subordinate power circuit-breaker 21 or 22 must open in order to avoid a disturbance in the other subdistribution networks. If the corresponding power circuit-breaker 21 or 22 fails, then the superordinate power circuit-breaker 2 must isolate the total quantity of subdistribution boards assigned to it from the rest of the network. It receives the triggering signal necessary for this purpose from a device 5 for selective network monitoring, which is described in detail below.

According to FIG. 3, the device 5 for selective network monitoring includes two parts: a diagnostic part 6, comprising a unit 7 for identifying the state of a circuit-breaker and a unit 8 for current measurement, and also a release 9 with corresponding intelligence for evaluating the information acquired from the diagnostic part 6.

In FIG. 3, the state identification unit has the task of identifying the case where switching contacts have opened. In the case of contacts that have opened, a signal is emitted to the triggering circuit. The current measurement in this case specifically pursues two aims: on the one hand, successful disconnection must be diagnosed, which can be effected by identifying a current zero crossing in the simplest case. On the other hand, is necessary to identify whether the post-arc current flowing after disconnection in the corresponding phase lies above the critical current limit for the interrupter, beyond which limit a failure must be expected with high probability. If both preconditions are met, that is to say disconnection took place and an excessively high post-arc current occurred, the release 9 receives a corresponding signal.

The triggering circuit outputs a trigger signal to the superordinate power circuit-breaker precisely when the two input signals of state identification and current measurement are present at the same time. As a result, the subdistribution boards supplied by the superordinate power circuit-breaker are isolated from the network, so that the path with the failing power circuit-breaker is de-energized and the short circuit in the region of the subdistribution board is not supplied with any further energy despite a failing power circuit-breaker.

The selective network monitoring is illustrated only once as a common unit 5 in FIG. 3. In actual fact, dedicated monitoring must be present in each of the subordinate power circuit-breakers 21 and 22 involved. In this case, it may be expedient in accordance with FIG. 3 for only the two functions "state identification" and "current measurement" to be separately assigned to each circuit-breaker 21, 22 and for a single triggering unit to be used, which is assigned to the associated superordinate power circuit-breaker 2. A corresponding bus system may be present for the purpose of communication.

Figure 4:
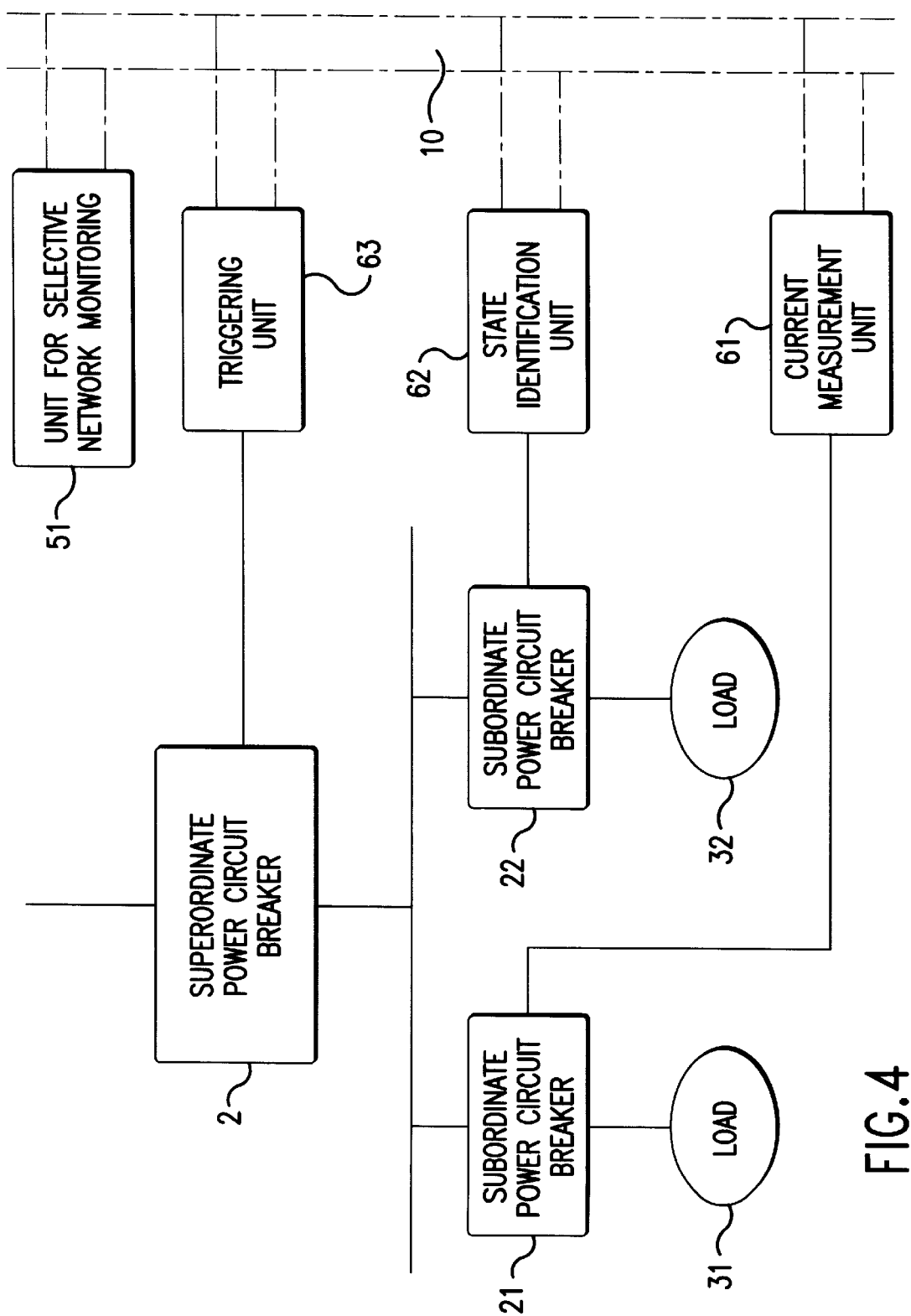
FIG. 4 shows a modification of the arrangement according to FIG. 3 with a bus system.

In FIG. 4, the arrangement of FIG. 3 is modified in such a way that units 61, 62 and 63 for current measurements, state identification and triggering, which are coupled via a bus system 10 to a unit 51 for the selective network monitoring, are respectively assigned to the system comprising superordinate power circuit-breaker 2 and subordinate power circuit-breakers 21, 22 with loads 23, 24 respectively connected downstream. Comprehensive communication is thus ensured.

The method described and the associated arrangement have been explained above specifically for a vacuum circuit-breaker with a single interrupter, that is to say for a single-phase network. In the case of three-phase networks, a separate current measurement is carried out for each phase of the subordinate power circuit-breaker.

Apart from vacuum circuit-breakers, the method can also be applied to other switching principles, provided that a comparable sharply defined limit corresponding to an imminent failure likewise exists for the current in those cases.

We claim:

1. A method for selective network monitoring for switchgear, comprising the steps of:

detecting electrical post-arc currents after current zero;

comparing the electrical post-arc currents to a predetermined limit value; and if the electrical post-arc currents exceed the predetermined limit value, generating a signal triggering a superordinate power circuit breaker in the switchgear.

2. The method according to claim 1, wherein the detecting step includes the step of:

measuring and analyzing the electrical post-arc currents after the current zero, the current zero being a first current zero crossing of an opening switching pole.

3. The method according to claim 1, wherein the predetermined limit value depends on a design of the switchgear.

4. The method according to claim 1, wherein the switchgear includes vacuum circuit-breakers with at least one vacuum interrupter, and wherein the detecting step includes the step of:

measuring the post-arc currents using a structural element of the vacuum interrupter.

5. The method according to claim 4, wherein the structural element includes a vapor shield.

6. The method according to claim 4, wherein the predetermined limit value is between 5 A and 15 A.

7. An arrangement for selective network monitoring for switchgear, comprising:

a superordinate power circuit breaker;

a plurality of subordinate power circuit breakers;

a monitoring device monitoring the subordinate power circuit breakers and triggering the superordinate power circuit breaker if electrical post-arc currents detected after current zero exceed a predetermined limit value.

8. The arrangement according to claim 7, further comprising:

dignostic units assigned to the monitoring device, the diagnostic units for state identification and current measurement of the superordinate power circuit breaker and the subordinate power circuit breakers.

9. The arrangement according to claim 7, further comprising:

a release coupled to the superordinate power circuit-breaker.

10. The arrangement according to claim 7, further comprising:

dedicated diagnostic units, each of the subordinate power circuit breakers being assigned a respective one of the dedicated diagnostic units, the diagnostic units for state identification and for current measurement; and a triggering unit for triggering the superordinate power circuit-breaker.

11. The arrangement according to claim 9, further comprising:

a bus system for data transmission coupled to at least one of the superordinate power circuit breaker, the subordinate power circuit breakers, and the monitoring device.

\* \* \* \* \*